United States Patent
Wu et al.

(10) Patent No.: US 9,212,723 B2
(45) Date of Patent: Dec. 15, 2015

(54) PNEUMATIC LIQUID ON-LINE AUTOMATIC BALANCER OF ROTOR

(71) Applicant: Beijing Bohua Xinzhi Technology, Inc., Beijing (CN)

(72) Inventors: Haiqi Wu, Beijing (CN); Xin Pan, Beijing (CN); Hui Gao, Beijing (CN)

(73) Assignee: BEIJING BOHUA XINZHI TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/370,049

(22) PCT Filed: Dec. 28, 2012

(86) PCT No.: PCT/CN2012/001777
§ 371 (c)(1),
(2) Date: Jun. 30, 2014

(87) PCT Pub. No.: WO2013/097301
PCT Pub. Date: Jul. 4, 2013

(65) Prior Publication Data
US 2014/0311281 A1    Oct. 23, 2014

(30) Foreign Application Priority Data

Dec. 30, 2011    (CN) .......................... 2011 1 0457792

(51) Int. Cl.
| | | |
|---|---|---|
| G05G 1/30 | (2008.04) | |
| F16F 15/16 | (2006.01) | |
| B23Q 11/00 | (2006.01) | |
| F16F 15/32 | (2006.01) | |
| G01M 1/32 | (2006.01) | |
| G01M 1/36 | (2006.01) | |
| F16F 15/173 | (2006.01) | |

(52) U.S. Cl.
CPC .......... *F16F 15/161* (2013.01); *B23Q 11/0035* (2013.01); *F16F 15/16* (2013.01); *F16F 15/173* (2013.01); *F16F 15/32* (2013.01); *F16F 15/322* (2013.01); *G01M 1/323* (2013.01); *G01M 1/365* (2013.01); *Y10T 74/2122* (2015.01)

(58) Field of Classification Search
CPC ....... F16F 15/173; F16F 15/32; F16F 15/322; F16F 15/161; F16F 15/16; G01M 1/323; G01M 1/365
See application file for complete search history.

(56) References Cited

U.S. PATENT DOCUMENTS 2,659,243 A * 11/1953 Darrieus .................... 74/573.11
3,950,897 A *  4/1976 Birkenstack et al. ......... 451/343
(Continued)

FOREIGN PATENT DOCUMENTS

| CN | 1358942 | 7/2002 |
| CN | 1647766 | 8/2005 |
| CN | 102183338 | 9/2011 |
| CN | 202083521 | 12/2011 |
| CN | 102840949 | 12/2012 |

(Continued)

*Primary Examiner* — Vicky Johnson (57) ABSTRACT

A pneumatic liquid on-line automatic balancer of a rotor includes: a sealed balancing disk rotating with a balanced rotor and a pressure transfer device mated with the sealed balancing disk. At least two pairs of centrosymmetric chambers filled with appropriate balancing liquid are evenly distributed in the sealed balancing disk. The pressure transfer device controls compressed gas in and out of the chamber and makes the balancing liquid controllably flow in each pair of chambers to achieve dynamic balance of the rotor. A communicating channel of the balancing liquid is provided between each pair of the chambers. The communicating channel of the balancing liquid is one and a center of the communicating channel of the balancing liquid is communicated with the balancing channel pointed to a center of rotation. The balancing channel is communicated with an emptying channel opened to atmosphere.

13 Claims, 8 Drawing Sheets

(56) References Cited

U.S. PATENT DOCUMENTS 4,002,086 A * 1/1977 Reinhall .................... 74/573.11
4,537,177 A * 8/1985 Steere et al. ............... 125/13.02

FOREIGN PATENT DOCUMENTS

GB 2080836 2/1982
WO 2004010022 1/2004

* cited by examiner

PNEUMATIC LIQUID ON-LINE AUTOMATIC BALANCER OF ROTOR

CROSS REFERENCE OF RELATED APPLICATION

This is a U.S. National Stage under 35 U.S.C. 371 of the International Application PCT/CN2012/001777, filed Dec. 28, 2012, which claims priority under 35 U.S.C. 119(a-d) to CN 201110457792.1, filed Dec. 30, 2011.

BACKGROUND OF THE PRESENT INVENTION

1. Field of Invention

The present invention relates to a shock absorber, in particular to an automatic shock absorber for a rotating device.

2. Description of Related Arts

The primary factor leading to the vibration is the mass unbalance of a rotating system. On-line automatic balance is the best scheme for improving the balance level of the rotating system and reducing the vibration.

At present, an automatic balance actuator of rotating machinery mainly involves two kinds of products: an electromagnetically mechanical balance actuator and a liquid injection-balance actuator.

The liquid injection-balance actuator has a simple structure. However, the actuator has less balance capability as the number of the balance increased, without shutdown hold function, so that liquid is required to be injected into the chamber rotating at high speed, and there is more uncertainty in terms of injection volume and the splash also has a certain influence on the surroundings. Because there is difficult to isolate the injection process from the surroundings, dust and other foreign matter are easy to be brought in and there is resistance change in the injection hole with small aperture, resulting in the decreased system control performance and even out of control.

The U.S. Pat. No. 4,537,177, which is titled "BALANCED ROTARY SAW ASSEMBLY AND A METHOD OF BALANCING THE SAME" and filed in 1985, disclosed an injection balancing device moved by driving the balancing liquid with compressed gas. In this patent, two opposite chambers were connected with two communicating tubes and a check valve with a movable element was also installed in the communicating tube, thus the balancing liquid in each communicating tube only could flow in one direction. The device was complex and the increase of the applicable speed was restricted by the movable element rotating with the device, therefore, the device only can be used for the on-line automatic balancer of a slowly rotating device such as a saw and the like. Furthermore, a minimal unbalance can create extremely high unbalanced centrifugal force in a high-speed rotating device, resulting in the severely vibration of the device.

SUMMARY OF THE PRESENT INVENTION

In order to solve the technical problem, the present invention provides a pneumatic liquid on-line automatic balancer of a rotor which is of permanent balance ability and is suitable for a high-speed rotating device.

To solve the above technical problem, the following solution is adopted in the present invention.

A pneumatic liquid on-line automatic balancer of a rotor includes a sealed balancing disk rotating with a balanced rotor about a central axis and a pressure transfer device mated with the sealed balancing disk. At least two pairs of centrosymmetric chamber filled with appropriate balancing liquid are evenly distributed in the sealed balancing disk. The pressure transfer device controls compressed gas in and out of the chamber and makes the balancing liquid controllably flow in each pair of the chambers to achieve dynamic balance of the rotor. A communicating channel of the balancing liquid is provided between outer edges of each pair of the chambers. The communicating channel of the balancing liquid is one and a center of the communicating channel of the balancing liquid is communicated with the balancing channel pointed to a center of rotation. Another end of the balancing channel is communicated with an emptying channel axially located near the center of rotation. Another end of the emptying channel is opened to atmosphere.

In the pneumatic liquid on-line automatic balancer of the rotor according to the present invention, the chambers in the sealed balancing disk are two pairs, the first and the third chambers are formed into one pair in which the communicating channel of the balancing liquid is a first communicating tube, and the second and the fourth chamber are formed into the other pair in which the communicating channel of the balancing liquid is a second communicating tube, the balancing channels are respectively a first and a second balancing tubes and the emptying channels are respectively a first and a second emptying tubes.

In the pneumatic liquid on-line automatic balancer of the rotor according to the present invention, the pressure transfer device includes a gas distributor, two position three way electromagnetic valves and a gas source which are communicated in turn. The gas distributor includes a central rotor, a middle sleeve and an outer stator. The outer stator is provided in a body of the balancing disk with a space between them. The middle sleeve and the central rotor are installed in an inner wall of the outer stator in turn with a gap between the middle sleeve and the central rotor. Two bearings are respectively arranged at ends of the middle sleeve and an outer race and an inner race of the above bearing is tight fitted with the inner wall of the outer stator and an outer wall of the central rotor respectively. A first, a second, a third and a fourth radial inlet channels are provided in an outer wall of the outer stator. The four radial inlet channels are arranged in the outer stator in an axial direction in turn and connected to first ends of a first, a second, a third and a fourth inlet pipes, respectively. Second ends of the four inlet pipes are connected to the gas source, respectively. The two position three way electromagnetic valve is provided in each of the four inlet pipes. Four axial inlet channels are provided in different radial angle positions of the central rotor and four circumferential gas inlet grooves are provided in the outer wall of the central rotor. One end of each axial inlet channel is respectively communicated with one of the corresponding circumferential gas inlet grooves through one radial hole and another end is communicated with a corresponding inlet branch. In an inner wall of each chamber is formed one inlet channel through which each the inlet branch is communicated with the corresponding chamber. Each the inlet branch is connected to a body of the balancing disk through a pipe joint. In the axial direction, the middle sleeve is provided with four vents in turn, one end of which is communicated with the four corresponding circumferential gas inlet groove respectively and the other end of which is communicated with the first, the second, the third and the fourth axial inlet channels respectively.

In the pneumatic liquid on-line automatic balancer of the rotor according to the present invention, the first and the second emptying tubes have a same structure, in which the first emptying tube includes an axial emptying section and a radial emptying section connected with each other and located in the central rotor, a radial emptying section located in the central sleeve and a radial emptying section located in the outer stator. The radial emptying section in the outer stator is opened to the atmosphere.

In the pneumatic liquid on-line automatic balancer of the rotor according to the present invention, the sealed balancing disk includes a body of the balancing disk and a cover hermetically sealed with the body of the balancing disk. The chambers are formed into two pairs and include a first, a second, a third and a fourth chambers. The first and the third chambers are formed into one pair and the second and the fourth chamber are formed into the other pair. The pressure transfer device includes a gas distributor, two position three way electromagnetic valves and a gas source which are pneumatically communicated in turn. The gas distributor includes a central stator and a middle sleeve. The central stator is arranged in a central hole in the body of the balancing disk and the middle sleeve is arranged between the central stator and the body of the balancing disk. There is a tight fit between the middle sleeve and a wall of the central hole and there is a gap between the middle sleeve and the central stator. Two bearings are respectively arranged at both ends of the middle sleeve. There is a tight fit between an outer race of the bearing and the wall of the central hole as well as between an inner race of the bearing and the central stator. A first, a second, a third and a fourth axial inlet channels are provided in the central stator and four circumferentially distributed annular grooves are provided in an outer wall of the central stator. First ends of the four axial inlet channels are respectively communicated with the annular groove through a radial vent. An injection tube is provided in the inner wall of each chamber and in an outer surface of the middle sleeve is provided with four axial grooves, one end of which is communicated with the injection tubes of the four chambers respectively and the other end of which is communicated with the annual groove in the central stator through the vent. The vents in the middle sleeve are provided at the ends of the axial grooves respectively and passed through the middle sleeve. Second ends of the first, the second, the third and the fourth axial inlet channels are connected to the gas source through a supply pipe, respectively. The two position three way electromagnetic valve is provided in each of the supply pipes. A central hole is provided in the cover and the cover comprises a left, a right and a middle plate fixed together in turn. A second balancing liquid communication channel and a second balancing channel of the second and the fourth chamber are provided in a right side of the left plate, and a first balancing liquid communication channel and a first balancing channel of the first and the third chambers are provided in a left side of the right plate. The centers of the first and the second balancing liquid communication channels are respectively connected with the first and the second balancing channels. A first and a second emptying channels are also provided in the cover, the second emptying channel is opened to the atmosphere through the right plate and the middle plate and the first emptying channel is opened to the atmosphere through the right plate. Another ends of the first and the second balancing channels are communicated with the first and the second emptying channels respectively.

In the pneumatic liquid on-line automatic balancer of the rotor according to the present invention, the sealed balancing disk includes a body of the balancing disk and a cover fixed by each other. The pressure transfer device includes a gas distributor, two position three way electromagnetic valves and a gas source which are pneumatically communicated in turn. The gas distributor is located at an axial outside of the sealed balancing disk and comprises a central rotor, a middle sleeve and an outer stator. The outer stator is sleeved on the central rotor and the middle sleeve is located between the central rotor and the outer stator. Four axial inlet channels are provided in the central rotor and a first, a second, a third and a fourth chambers are provided in the body of the balancing disk, wherein, the first and the third chambers are formed into one pair and the second and the fourth chambers are formed into the other pair. The cover is made into three layers and includes a left plate, a right plate and a middle plate hermetically sealed by each other. The right plate is integrated with the central rotor. The balancing liquid communication channel between the second and the fourth chambers is the second communication channel in a right side of the left plate and the balancing liquid communication channel between the first and the third chambers is the first communication channel in a left side of the right plate. The balancing channels are the second balancing channel in the right side of the left plate and the first balancing channel in the left side of the right plate. In a left surface of the right plate are provided with four injection channels, one end of which is respectively communicated with the axial inlet channel in the central rotor and the other end of which is communicated with the four chambers through injection holes in the middle and the left plate respectively. The centers of the first and the second communication channels are respectively connected with first ends of the first and the second balancing channels. Second ends of the first and the second balancing channels are connected to a first and a second vents respectively. A first and a second axial extending emptying tubes are provided in the central rotor. The first vent is communicated with the first emptying tube through the right plate and the second vent is communicated with the second emptying tube through the right and the middle plates. The first vent and the first emptying tube form the first emptying channel and the second vent and the second emptying tube form the second emptying channel, and the first and the second communication channels are Venturi necking channels.

In the pneumatic liquid on-line automatic balancer of the rotor according to the present invention, the ends of the first and the second emptying tubes are both provided with a gas-permeable and anti-liquid plug.

In the pneumatic liquid on-line automatic balancer of the rotor according to the present invention, the first, the second, the third and the fourth chambers are sectors.

In the pneumatic liquid on-line automatic balancer of the rotor according to the present invention, the arc outer wall of each chamber is a conical surface outward leaned in the axial direction.

In the pneumatic liquid on-line automatic balancer of the rotor according to the present invention, the connections between the first communication channel and the first and the third chambers are respectively notched in the grooves in the arc outer walls of the first and the third chambers, and the connections between the second communication channel and the second and the fourth chambers are respectively notched in the grooves in the arc outer walls of the second and the fourth chambers.

In the pneumatic liquid on-line automatic balancer of the rotor according to the present invention, an alternative cover is made into four layers instead of three layers and includes a left plate, a middle plate, a first right plate and a second right plate, four injection channels are positioned in a right side of the left plate, a first communication channel is positioned in a left side of the first right plate, a second communication channel is positioned in a left side of the second right plate, and the first and the second communication channels are Venturi channels.

In the pneumatic liquid on-line automatic balancer of the rotor according to the present invention, there are also five pressure-equalizing grooves in the central rotor, which are circumferential annular grooves provided in the outer wall of the central rotor, and the five pressure-equalizing grooves and the four gas inlet grooves are alternately distributed.

In the pneumatic liquid on-line automatic balancer of the rotor according to the present invention, there are also five pressure-equalizing grooves in the central stator, which are circumferential annular grooves provided in the outer wall of the central stator, and the pressure-equalizing grooves are communicated with five pressure relief holes provided in the central sleeve.

In the pneumatic liquid on-line automatic balancer of the rotor according to the present invention, because there is one balancing liquid communication channel between the outer edges of each pair of the chambers, the center of the balancing liquid communication channel is communicated with one end of the balancing channel pointed to the center of rotation, the other end of the balancing channel is connected to one end of the emptying channel and the other end of the emptying channel is opened to the atmosphere, the atmosphere can be drawn in through the emptying channel under negative pressure generated in the center of the balancing liquid communication channel after the compressed gas fed in the chamber is cut off, making directional flow of the balancing liquid in the balancing liquid communication channel to end. A function of the balancing channel is that, when the compressed gas is fed in the chamber and a pressure in the chamber has reached to a certain value, the balancing liquid would flow through the center of the balancing liquid communication channel and accelerate to the opposite chamber. Meanwhile, if the pressure of the balancing liquid in the center of the balancing liquid communication channel is below atmospheric pressure, a part of the balancing liquid would enter into the balancing channel and then generate a centrifugal force to prevent more the balancing liquid from entering the balancing channel, therefore leakage of the balancing liquid from the emptying channel is prevented, and the device is of a permanent balance ability and is suitable for a high-speed rotating device.

The cover includes the left plate, the middle plate and the right plate, and the two balancing liquid communication channels and the two balancing channels are respectively provided in the left and the right plate, thus the pneumatic liquid on-line automatic balancer of the rotor according to the present invention has a simpler structure and is adaptable to a high-speed rotating condition better.

Due to the gas-permeable and anti-liquid plug provided in the end of the emptying tube, the balancing liquid can be prevented from shooting under misoperation or a fault of a relief valve of the gas source, without the loss of the balancing liquid.

Due to viscosity of the balancing liquid, a layer of the balancing liquid can be stuck to the outer annular wall of the chamber and can not to be used during high-speed rotation. The arc outer wall of the chamber is the conical surface outward leaned in the axial direction so that an inner diameter at an outlet of the balancing liquid communication channel is the maximum among those at all axial positions. Because of this, the balancing liquid can be concentrated near the outlet of the leaned outer edge when a few is left and a utilization ratio of the balancing liquid can be improved.

Because the connections between the first communication channel and the first and the third chambers are respectively notched in the grooves in the arc outer wall of the first and the third chambers, and the connections between the second communication channel and the second and the fourth chambers are respectively notched in the grooves in the arc outer wall of the second and the fourth chambers, no gas can enter the balancing liquid communication channel before all the balancing liquid is emptied, avoiding that the gas is vented from the emptying channel along with the balancing liquid drop in case that there is few balancing liquid in the chamber and, therefore, ensuring a maximum design balance ability of the pneumatic liquid on-line automatic balancer of the rotor according to the present invention can be met in operation.

There are also five pressure-equalizing grooves in the central rotor which are respectively communicated with five pressure relief holes provided in the outer stator, so that each the gas inlet groove keeps relative independence without an interaction effect during gas injection process. Due to the small pressure relief hole, the annular pressure-equalizing groove plays a role in certainly increasing resistance of the gas leakage and keeps the gas inlet grooves in a same sealed environment.

Position determination of all holes in the chamber is required to meet a requirement that there is no leakage of the balancing liquid to outside in the high-speed rotation and stationary states of the sealed balancing disk.

The gap between the middle sleeve and the stator or the rotor of the pressure transfer device according to the present invention has a certain influence on pressure transmissibility; however, a flowing area of the inlet in the stator has more influence on the pressure transmissibility. Due to usage of a good inlet design and the appropriate gap, the pressure transmissibility can be up to 85%.

The pneumatic liquid on-line automatic balancer of the rotor according to the present invention would be further explained in conjunction with the accompanying drawings below.

DETAILED DESCRIPTION OF THE PREFERRED EMBODIMENT

Figure 1:
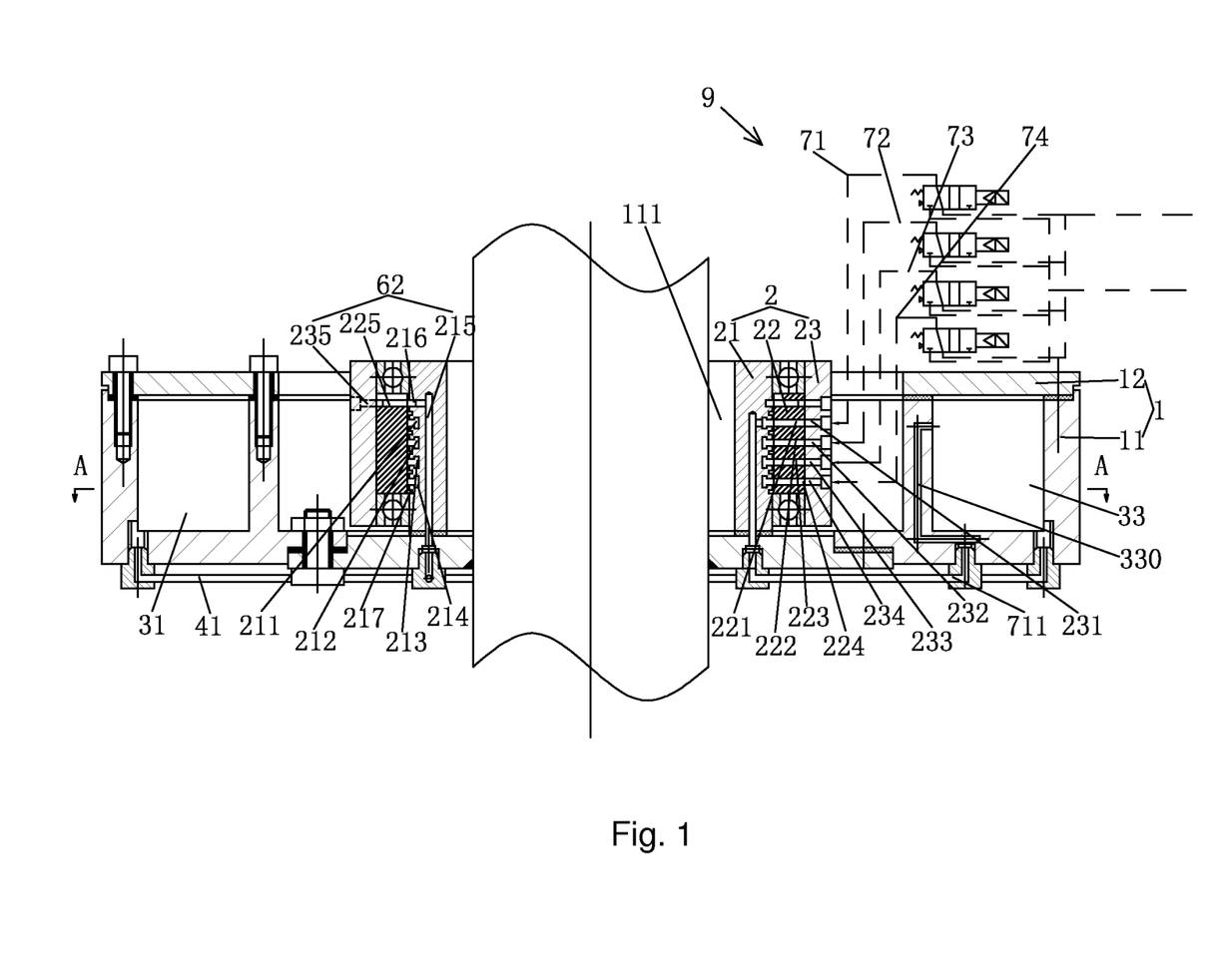
FIG. 1 is a front sectional view of a pneumatic liquid on-line automatic balancer of a rotor according to embodiment 1 of the present invention.
Figure 2:
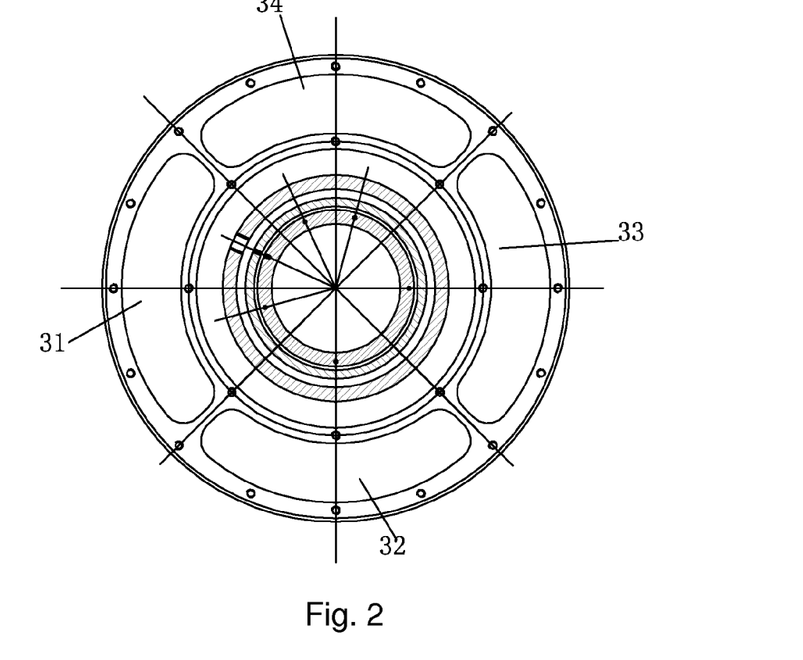
FIG. 2 is a sectional view taken along the line A-A of FIG. 1.
Figure 3:
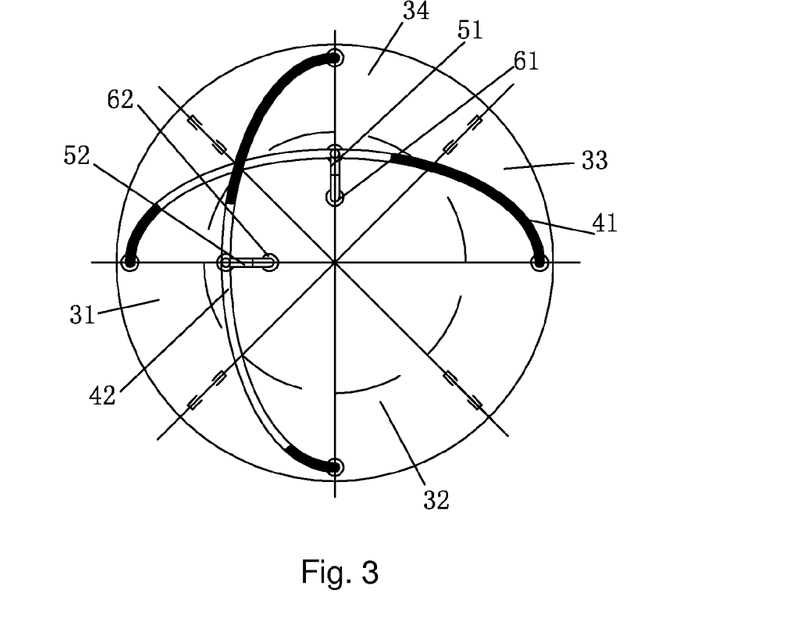
FIG. 3 is a bottom view of the pneumatic liquid on-line automatic balancer of the rotor according to the embodiment 1 of the present invention.

In embodiment 1 as shown in FIGS. 1-2, a pneumatic liquid on-line automatic balancer of a rotor includes a sealed balancing disk 1 and a pressure transfer device 9. The pressure transfer device 9 includes a gas distributor 2, two position three way electromagnetic valves and a gas source. The sealed balancing disk 1 includes a body 11 of the balancing disk and a cover 12 which is fixed in the body 11 of the balancing disk by bolts. A central hole 111 is provided in the body 11 of the balancing disk and a first, a second, a third and a fourth chambers 31, 32, 33, 34 are uniformly formed between the central hole 111 and an outer wall of the body 11 of the balancing disk. The first and the third chambers 31, 33 are formed into one symmetric pair and the second and the fourth chambers 32, 34 are formed into the other symmetric pair. Each the chamber is filled with balancing liquid, whose volume is less than half of each chamber's volume. The balancing liquid can be water, silicone oil, fluorocarbon oil, liquid gallium and the like. As shown in FIG. 3, a first communication tube 41 is provided between the first and the third chambers 31, 33 and a second communication tube 42 is provided between the second and the fourth chambers 32, 34. Centers of the first and the second communication tubes 41, 42 are respectively connected with the first and the second balancing tubes 51, 52. First ends of the first and the second balancing tubes 51, 52 are pointed to a center of rotation and second ends are connected to first ends of a first and a second emptying tubes 61, 62 axially located near the center of rotation. Second ends of the first and the second emptying tubes 61, 62 are opened to atmosphere. The first and the second communication tubes 41, 42 and the first and the second balancing tubes 51, 52 are arranged outside of the sealed balancing disk 1. The first communication tube 41 is the liquid channel between the first and the third chambers 31, 33, the second communication tube 42 is the liquid channel between the second and the fourth chambers 32, 34, and the first and the second balancing tubes 51, 52 form the balancing channel. The gas distributor 2 comprises a central rotor 21, a middle sleeve 22 and an outer stator 23. The outer stator 23 is provided in the central hole 111 in the body of the balancing disk with a space between the outer stator 23 and the body 11 of the balancing disk. The outer stator 23 is annular and an inner wall of the outer stator 23 is provided with the middle sleeve 22 and the central rotor 21 in turn with a gap between the middle sleeve 22 and the central rotor 21. Two bearings are respectively arranged at two ends of the middle sleeve 22 and an outer race and an inner race of the above bearings are tightly fitted with the inner wall of the outer stator 23 and an outer wall of the central rotor 21 respectively. A first, a second, a third and a fourth radial inlet channels 231, 232, 233, 234 are provided in an outer wall of the outer stator 23. The four radial inlet channels are arranged in the outer stator 23 in an axial direction in turn and first ends of a first, a second, a third and a fourth inlet pipes 71, 72, 73, 74 are connected to the first, the second, the third and the fourth radial inlet channels 231, 232, 233, 234, respectively. Four two position three way electromagnetic valves are provided in the first, the second, the third and the fourth inlet pipes 71, 72, 73, 74, respectively. Second ends of the first, the second, the third and the fourth inlet pipes 71, 72, 73, 74 are connected to a gas source. Four axial inlet channels are provided in different radial angle positions of the central rotor 21 and four circumferential gas inlet grooves 211, 212, 213, 214 are provided in the central rotor 21. The gas inlet grooves are circumferential annular grooves provided in the outer wall of the central rotor 21 in turn. One end of each axial inlet channel is respectively communicated with the gas inlet groove through one radial hole and the other end is communicated with one inlet branch 711. In the annular inner walls of the first, the second, the third and the fourth chambers 31, 32, 33, 34 are formed one inlet channel communicated with the chambers, such as the inlet channel 330 in the third chamber 33 as shown in FIG. 3. Each the inlet branch is communicated with the first, the second, the third and the fourth chambers 31, 32, 33, 34 through the inlet channel and connected to the sealed balancing disk 1 through a pipe joint, respectively. In the axial direction, the middle sleeve 22 is provided with four vents 221, 222, 223, 224 in turn, one end of which is communicated with the four gas inlet grooves 211, 212, 213, 214 respectively and the other end of which is communicated with the first, the second, the third and the fourth radial inlet channels 231, 232, 233, 234 respectively. The first and the second emptying tubes 61, 62 have a same structure, as shown in FIG. 1. The first emptying tube 62 includes an axial emptying section 215 and a radial emptying section 216 located in the central rotor 21, a radial emptying section 225 located in the central sleeve 22 and a radial emptying section 235 located in the outer stator 23. The radial emptying section 235 in the outer stator 23 is opened to the atmosphere.

Moreover, there are also five pressure-equalizing grooves 217 in the central rotor 21, which are circumferential annular grooves provided in the outer wall of the central rotor 21, and the five pressure-equalizing grooves and the four gas inlet grooves 211, 212, 213, 214 are alternately distributed.

Figure 4:
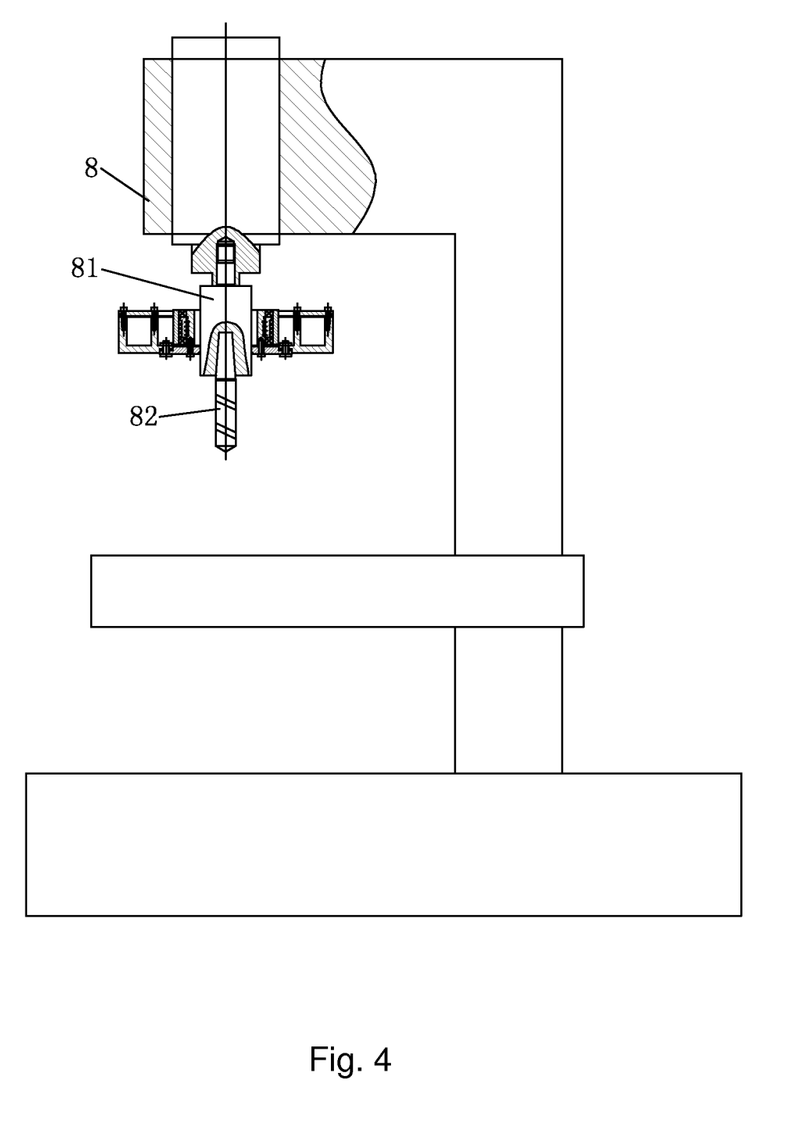
FIG. 4 is an installation schematic of the pneumatic liquid on-line automatic balancer of the rotor according to the embodiment 1 of the present invention.

In use, as shown in FIG. 4, the pneumatic liquid on-line automatic balancer of the rotor is installed at a motorized spindle connecting rod 81 of a drilling machine 8. The motorized spindle connecting rod 81 drives the sealed balancing disk 1 and the central rotor 21 to rotate together. A vibration sensor and a proximity switch are installed on the motorized spindle connecting rod 81. The vibration sensor, the proximity switch and four two position three way electromagnetic valves are connected to an automatic balance controller, and a vibration waveforms signal is transmitted from the vibration sensor to the automatic balance controller. In each rotation of the pneumatic liquid on-line automatic balancer of the rotor according to the present invention, a keyway in the motorized spindle connecting rod 81 would pass over the proximity switch, the proximity switch would output a pulse to the automatic balance controller, a speed of the balanced rotor, an amplitude and phase data of unbalance are extracted from the measured signals of the vibration sensor and the proximity switch by the automatic balance controller, then a transfer object and a transfer quantity of balance control are accordingly calculated and an application time is used as a measure of the transfer quantity. For example, after calculation, the first chamber 31 should be transferred to the third chamber 33 for 2.2 second and the second chamber 32 should be transferred to the fourth chamber 34 for 5.4 second, hence, energization commands for 2.2 seconds and 5.4 seconds are respectively issued to the two position three way electromagnetic valves in the inlet pipes of the first and the second chambers. The compressed gas is leaded to the radial inlet channel in the outer stator 23 through the two position three way electromagnetic valve, to the gas inlet groove in the central rotor 21 through a vent groove in the middle sleeve 22 and the radial communication tube, to the axial inlet channel through the radial hole and to the chamber through the corresponding inlet branch. Under the pressure, the balancing liquid in the first chamber 31 flows to the third chamber 33 through the first communication tube 41 and the balancing liquid in the second chamber 32 flows to the fourth chamber 34 through the second communication tube 42. After 2.2 seconds, the two position three way electromagnetic valve in the inlet pipe of the first chamber is deenergized and the two position three way electromagnetic valve in the inlet pipe of the second chamber is not deenergized till 5.4 seconds. The automatic balancer controller will send the control command of a second cycle in basis of a residual system unbalance at an end of a first control cycle in addition until the vibration falls in an allowable scope, then the balance process will finish. Under the control of the automatic balancer controller, the inlet can be thoroughly cut off and no pressure can be supplied to the chamber, the compressed gas in the chamber would retrace the flow and be emptied from a normally-open port of the two position three way electromagnetic valve.

Figure 5:
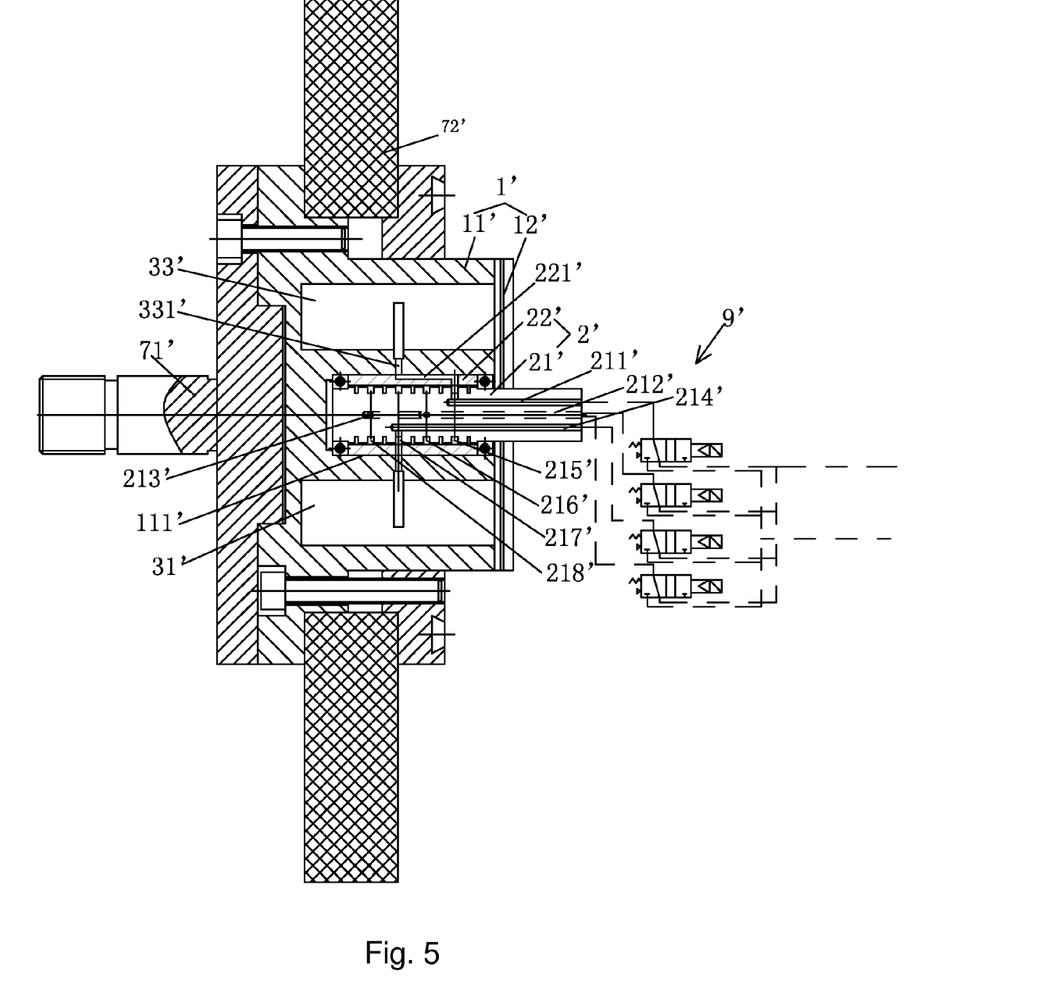
FIG. 5 is a front sectional view of the pneumatic liquid on-line automatic balancer of the rotor according to embodiment 2 of the present invention.
Figure 6:
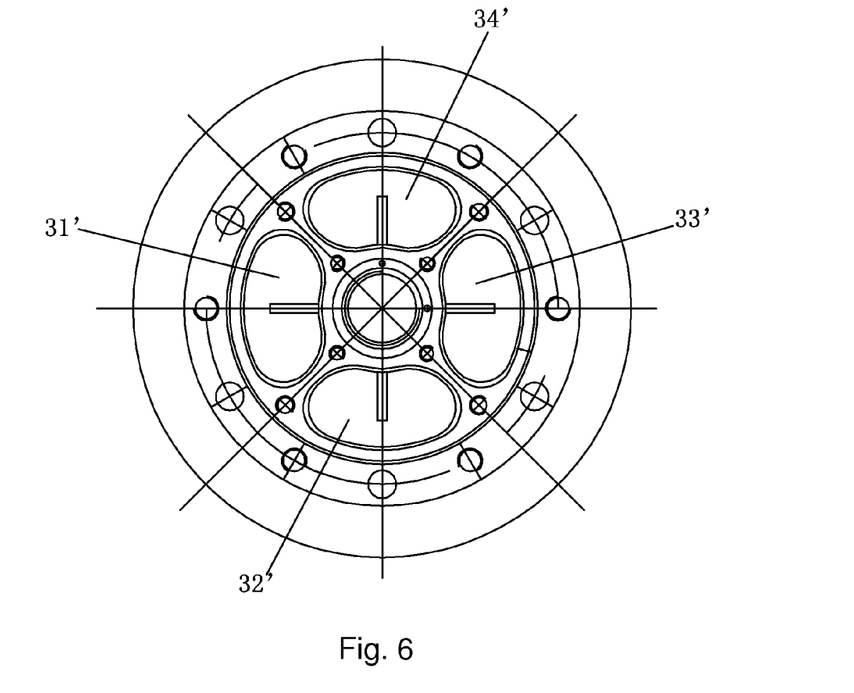
FIG. 6 is a left view of a sealed balancing disk of the pneumatic liquid on-line automatic balance of the rotor according to the embodiment 2 of the present invention.
Figure 7:
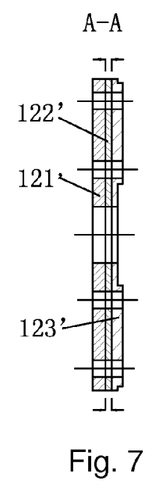
FIG. 7 is a sectional view of a cover of the pneumatic liquid on-line automatic balancer of the rotor according to the embodiment 2 of the present invention.
Figure 8:
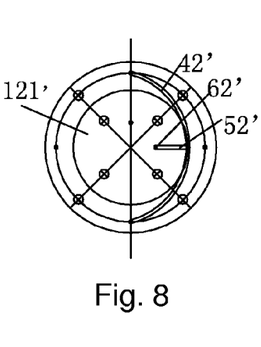
FIG. 8 is a left view of a left plate of the cover of the pneumatic liquid on-line automatic balancer of the rotor according to the embodiment 2 of the present invention.
Figure 9:
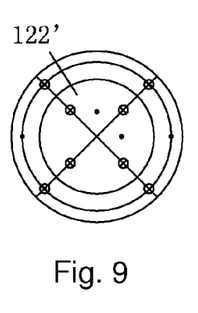
FIG. 9 is a right view of a middle plate of the cover of the pneumatic liquid on-line automatic balancer of the rotor according to the embodiment 2 of the present invention.
Figure 10:
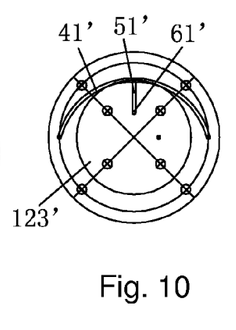
FIG. 10 is a right view of a right plate of the cover of the pneumatic liquid on-line automatic balancer of the rotor according to the embodiment 2 of the present invention.

In embodiment 2 as shown in FIGS. 5-6, a pneumatic liquid on-line automatic balancer of a rotor includes a sealed balancing disk 1' and a pressure transfer device 9'. The pressure transfer device 9' includes a gas distributor 2', two position three way electromagnetic valves and a gas source. The sealed balancing disk 1' includes a body 11' of the balancing disk and a cover 12' which is fixed in the body 11' of the balancing disk by bolts. The body 11' of the balancing disk is circular. A first, a second, a third and a fourth chambers 31', 32', 33', 34' are uniformly formed between a central hole 111' and an inner wall of the body 11' of the balancing disk, and the four chambers are sectors. The embodiment 2 differs from embodiment 1 in that the sealed balancing disk 1' is installed vertically, a volume of balancing liquid in each the chamber is less than the one fourth of each chamber's volume. The gas distributor 2' comprises a central stator 21' and a middle sleeve 22'. The central stator 21' is arranged in the central hole 111' in the body 11' of the balancing disk and the middle sleeve 22' is arranged between the central stator 21' and the body 11' of the balancing disk. There is a tight fit between the middle sleeve 22' and a wall of the central hole 111' and there is a gap between the middle sleeve and the central stator 21'. Two bearings are respectively arranged at both ends of the middle sleeve 22'. There is a tight fit between an outer race of the bearing and the wall of the central hole 111' as well as between an inner race of the bearing and the central stator 21'.

A first, a second, a third and a fourth axial inlet channels 211', 212', 213', 214' are provided in the central stator 21' and four circumferentially distributed annular grooves 215', 216', 217', 218' are provided in an outer wall of the central stator 21'. First ends of the four axial inlet channels are respectively communicated with the annular groove through a radial vent. A gas injection tube 331' is provided in an inner walls of the first, the second, the third and the fourth chambers 31', 32', 33', 34', respectively and in an outer surface of the middle sleeve 22' is provided with four axial grooves 221', one end of which is communicated with the gas injection tubes 331' of the four chambers respectively and the other end of which is communicated with one annular groove in the central stator 21' through the vent. The vents are provided at the ends of the axial grooves respectively and passed through the middle sleeve 22'. Second ends of the first, the second, the third and the fourth axial inlet channels 211', 212', 213', 214' are connected to the gas source through a supply pipe, respectively. One of the two position three way electromagnetic valves is provided in each the supply pipe, as shown in FIGS. 7, 8, 9 and 10. A central hole is provided in the cover 12' and the cover 12' comprises a left, a right plate 121', 123' and a middle plate 122' welded together by braze welding in turn. A second balancing liquid communication channel 42' and a second balancing channel 52' of the second and the fourth chambers are provided in a right side of the left plate 121', and a first balancing liquid communication channel 41' and a first balancing channel 51' of the first and the third chambers are provided in a left side of the right plate. Centers of the first and the second balancing liquid communication channels 41', 42' are respectively connected with the first and the second balancing channels 51', 52'. First ends of the first and the second balancing channels 51', 52' are pointed to a center of rotation and second ends thereof are connected to a first and a second emptying channels 61', 62' axially located near the center of rotation. The second emptying channel 62' is opened to the atmosphere through the right plate and the middle plate and the first emptying channel 61' is opened to the atmosphere through the right plate. There are also five pressure-equalizing grooves in the central stator 21'.

In use, as shown in FIG. 5, the sealed balancing disk 1' is fixed at a motorized spindle connecting rod 71' by bolts, then a grinding wheel 72' is clamped on the sealed balancing disk 1' by a flange 73' and fixed by bolts, and the motorized spindle drives the sealed balancing disk 1' and the grinding wheel 72' rotate together. A control method is the same as that of the embodiment 1.

Figure 11:
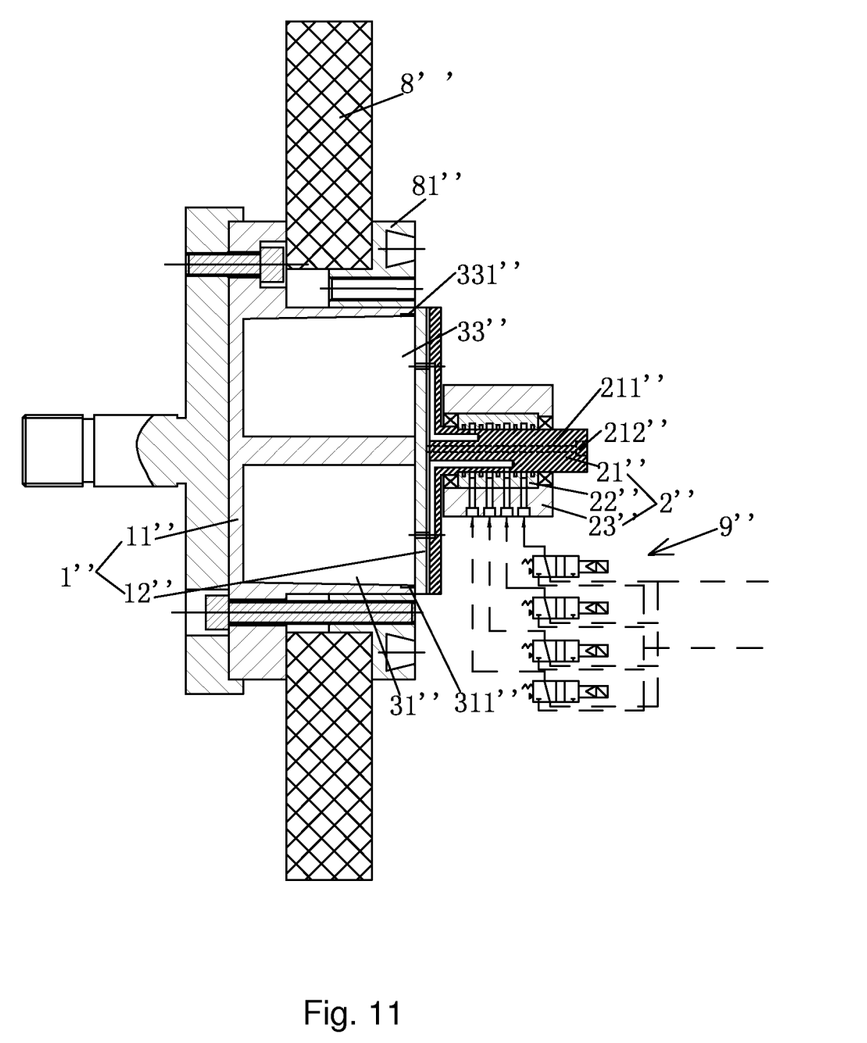
FIG. 11 is a front sectional view of the pneumatic liquid on-line automatic balancer of the rotor according to embodiment 3 of the present invention.
Figure 12:
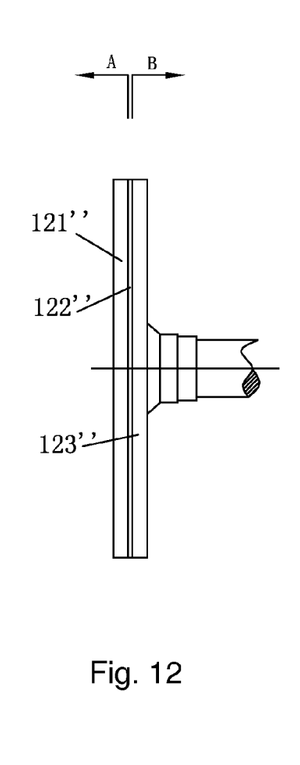
FIG. 12 is a front view of the cover of the pneumatic liquid on-line automatic balancer of the rotor according to the embodiment 3 of the present invention.
Figure 13:
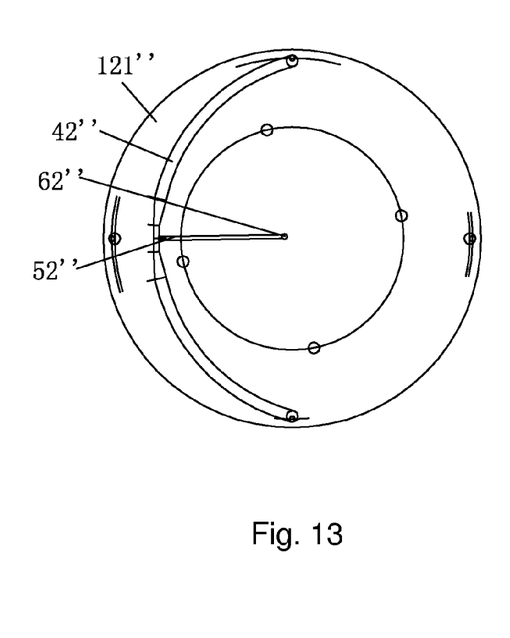
FIG. 13 is a left view of the left plate of the cover of the pneumatic liquid on-line automatic balancer of the rotor according to the embodiment 3 of the present invention.
Figure 14:
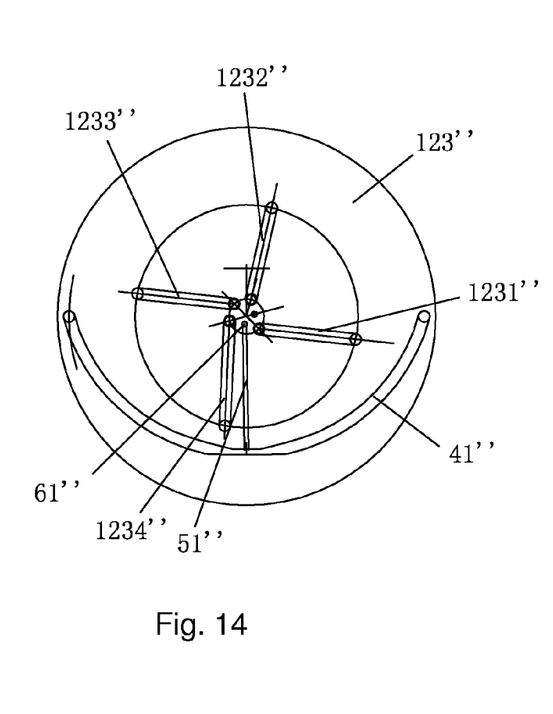
FIG. 14 is a right view of the right plate of the cover of the pneumatic liquid on-line automatic balancer of the rotor according to the embodiment 3 of the present invention.
Figure 15:
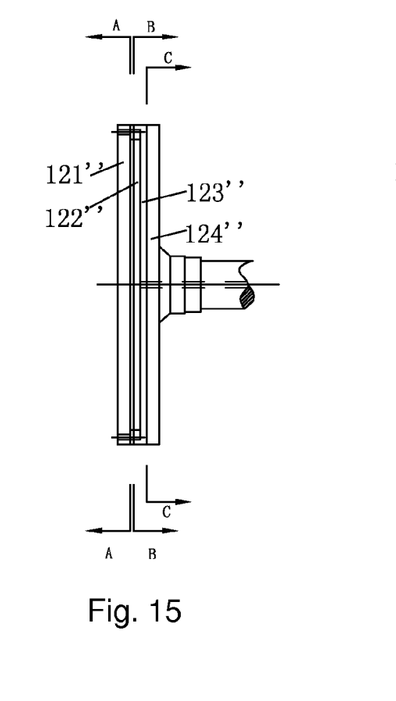
FIG. 15 is a front view of an alternative cover of the pneumatic liquid on-line automatic balancer of the rotor according to the embodiment 3 of the present invention.
Figure 16:
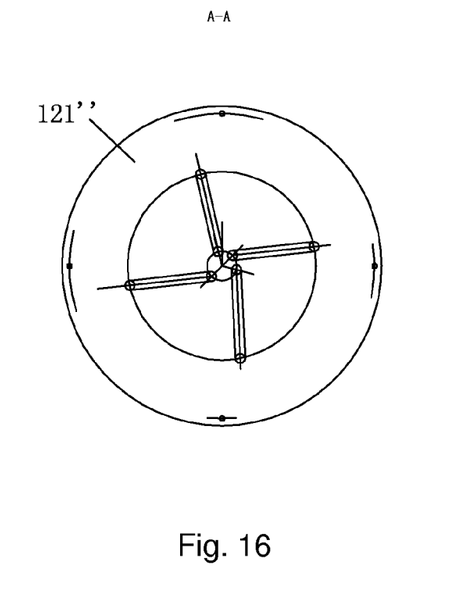
FIG. 16 is a left view of a left plate of the alternative cover of the pneumatic liquid on-line automatic balancer of the rotor according to the embodiment 3 of the present invention.
Figure 17:
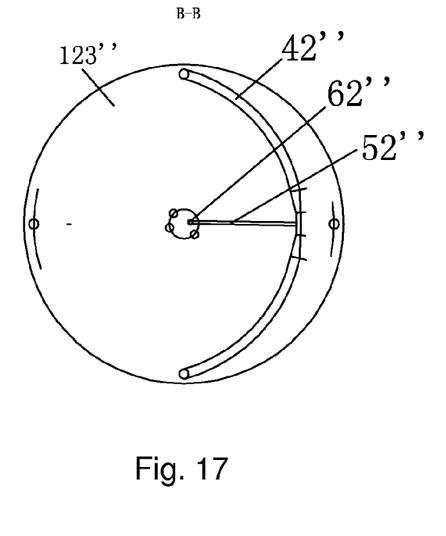
FIG. 17 is a right view of a first right plate of the alternative cover of the pneumatic liquid on-line automatic balancer of the rotor according to the embodiment 3 of the present invention.
Figure 18:
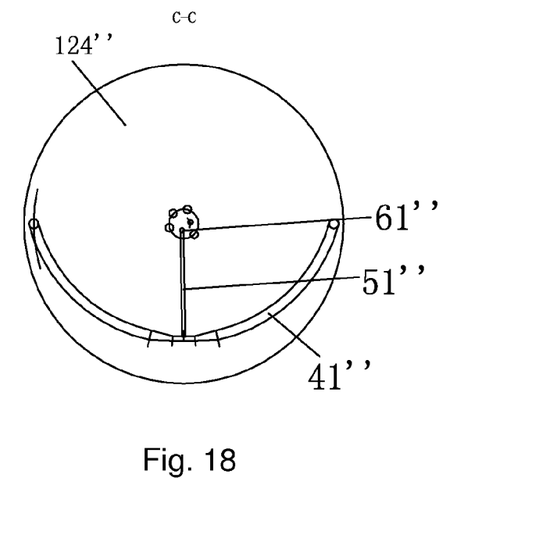
FIG. 18 is a right view of a second right plate of the alternative cover of the pneumatic liquid on-line automatic balancer of the rotor according to the embodiment 3 of the present invention.

In embodiment 3 as shown in FIG. 11, a pneumatic liquid on-line automatic balancer of a rotor includes a sealed balancing disk 1" and a pressure transfer device 9". The sealed balancing disk 1" includes a body 11" of the balancing disk and an alternative cover 12" which connected with the body 11" of the balancing disk by braze welding. The pressure transfer device 9" includes a gas distributor 2", two position three way electromagnetic valves and a gas source. The gas distributor 2" comprises a central rotor 21", a middle sleeve 22" and an outer stator 23". The embodiment 3 differs from embodiment 1 in that the gas distributor 2" is located axial outside of the sealed balancing disk 1". The sealed balancing disk 1" is uniformly divided into a first, a second, a third and a fourth chambers 31", 32", 33", 34" which are sectors, as shown in FIGS. 12, 13 and 14. The alternative cover 12" comprises a left, a right and a middle plate 121", 123", 122" welded together by braze welding. The right plate 123" is integrated with the central rotor 21", the outer stator 23" is sleeved on the central rotor 21" and the middle sleeve 22" is located between the central rotor 21" and the outer stator 23".

A second balancing liquid communication channel 42" and a second balancing channel 52" of the second and the fourth chambers are provided in a right side of the left plate 121". In a left side of the right plate 123" are provided with a first balancing liquid communication channel 41", a first balancing channel 51" of the first and the third chambers and four gas injection channels 1231", 1232", 1233", 1234". First ends of the four gas injection channels are respectively communicated with one axial inlet channel in the central rotor 21" and second ends of the four injection channels are communicated with the four chambers through gas injection holes provided in the middle and the left plates respectively. Centers of the first and the second communication channels 41", 42" are respectively connected with the first and the second balancing channels 51", 52". First ends of the first and the second balancing channels 51", 52" are pointed to a center of rotation and second ends thereof are connected to a first and a second emptying vents 61", 62" axially located near the center of rotation. A first and a second axial extending emptying tubes are provided in the central rotor 21". Ends of the first and the second emptying tubes are both provided with a gas-permeable and anti-liquid plug, that is, the first emptying tube 211" and the gas-permeable and anti-liquid plug 212" at the end thereof shown in FIG. 11. The first vent 61" is communicated with the first emptying tube through the right plate and the second vent 62" is communicated with the second emptying tube through the right and the middle plates. The first vent 61" and the first emptying tube form the first emptying channel and the second vent 62" and the second emptying tube form the second emptying channel, and the first and the second communication channels 41", 42" may be Venturi necking channels. There are also five pressure-equalizing grooves in the central stator 21".

As shown in FIGS. 15-18, an alternative cover 12" can be made into four layers to simplify machining process of the groove or the hole in the cover with a small diameter. The alternative cover 12" includes a left plate 121", a middle plate 122", a first right plate 123" and a second right plate 124", four gas injection channels are positioned in a right side of the left plate 121", the first communication channel 41" is positioned in a left side of the first right plate 123", the second communication channel 42" is positioned in a left side of the second right plate 124", and the first and the second communication channels 41", 42" may be Venturi channels.

Moreover, as shown in FIG. 11, the arc outer wall of the chamber is a conical surface outward leaned in an axial direction. The connections between the first communication channel 41" and the first and the third chambers 31", 33" are respectively notched in the grooves 311", 331" in the arc outer walls of the first and the third chambers, and the connections between the second communication channel 42" and the second and the fourth chambers 32", 34" are respectively notched in the grooves in the arc outer walls of the second and the fourth chambers.

The embodiments described above only describe the preferred embodiments of the present invention and are not intended to limit the present invention. Various changes and modifications to the embodiments of the present invention made by those skilled in the art may fall in the scope as defined by the appended claims without departing the design spirit of the present invention.

Industrial Application

The pneumatic liquid on-line automatic balancer of the rotor according to the present invention can be used in various rotating devices, especially in a high-speed rotating device, improving the balance level of the high-speed rotating device, reducing the vibration, being of compact structure, permanent balance ability and industrial applicability.

What is claimed is:

1. A pneumatic liquid on-line automatic balancer of a rotor, comprising a sealed balancing disk (1) rotating with a balanced rotor about a central axis and a pressure transfer device (9) mated with the sealed balancing disk (1), wherein at least two pairs of centrosymmetric chambers (31, 32, 33, 34) filled with appropriate balancing liquid are evenly distributed in the sealed balancing disk, the pressure transfer device controls compressed gas in and out of a chamber and makes the balancing liquid controllably flow in each pair of the chambers to achieve dynamic balance of the rotor, a communicating channel of the balancing liquid is provided between outer edges of each pair of the chambers, a quantity of the communicating channel of the balancing liquid is one, a center of the communicating channel of the balancing liquid is communicated with a balancing channel pointed to a center of rotation, the balancing channel is communicated with an end of an emptying channel axially located near the center of rotation, and the other end of the emptying channel is opened to atmosphere;

wherein, the chambers in the sealed balancing disk (1) are two pairs, the first and the third chambers (31, 33) are formed into one pair in which the communicating channel of the balancing liquid is a first communicating tube (41), and the second and the fourth chambers (32, 34) are formed into one pair in which the communicating channel of the balancing liquid is a second communicating tube (42), the balancing channels are respectively a first and a second balancing tubes (51, 52) and emptying channels are respectively a first and a second emptying tubes (61, 62).

2. The pneumatic liquid on-line automatic balancer of the rotor of claim 1, wherein, the pressure transfer device (9) comprises a gas distributor (2) and two position three way electromagnetic valves, the gas distributor (2) comprises a central rotor (21), a middle sleeve (22) and an outer stator (23), the outer stator (23) is provided in a body (11) of the balancing disk with a space between the outer stator (23) and the body (11) of the balancing disk, an inner wall of the outer stator (23) is provided with the middle sleeve (22) and the central rotor (21) in turn with a gap between the middle sleeve (22) and the central rotor (21), two bearings are respectively arranged at ends of the middle sleeve (22) and an outer race and an inner race of the above bearing is tightly fitted with the inner wall of the outer stator (23) and an outer wall of the central rotor (21), respectively, a first, a second, a third and a fourth radial inlet channels (231, 232, 233, 234) are provided in an outer wall of the outer stator (23), the four radial inlet channels are arranged in the outer stator (23) in an axial direction in turn and a first, a second, a third and a fourth inlet pipes (71, 72, 73, 74) are connected to the first, the second, the third and the fourth radial inlet channels (231, 232, 233, 234), respectively, one of the two position three way electromagnetic valve is provided in the first, the second, the third and the fourth inlet pipes (71, 72, 73, 74), respectively, four axial inlet channels are provided in different radial positions of the central rotor (21) and four circumferential gas inlet grooves (211, 212, 213, 214) are provided in the outer wall of the central rotor (21), one end of each the axial inlet channel is respectively communicated with each of the circumferential gas inlet grooves (211, 212, 213, 214) through one radial hole and the other end is communicated with a corresponding inlet branch (711), in annular inner walls of the four chambers are formed one inlet channel through which the branch is communicated with the corresponding chamber, respectively, the inlet branch is connected to the body (11) of the sealed balancing disk, the middle sleeve (22) is provided with four vents (221, 222, 223, 224) in turn, one end of which is communicated with the four circumferential gas inlet grooves (211, 212, 213, 214) respectively and the other end of which is communicated with the first, the second, the third and the fourth radial inlet channels (231, 232, 233, 234) respectively.

3. The pneumatic liquid on-line automatic balancer of the rotor of claim 2, wherein, the first and the second emptying tubes (61, 62) have a same structure, the first emptying tube (62) comprises an axial emptying section (215) and a first radial emptying section (216) located in the central rotor (21), a second radial emptying section (225) located in the central sleeve (22) and a third radial emptying section (235) located in the outer stator (23), the third radial emptying section (235) in the outer stator (23) is opened to the atmosphere.

4. The pneumatic liquid on-line automatic balancer of the rotor of claim 3, wherein, there are also five pressure-equalizing grooves (217) in the central rotor (21), which are circumferential annular grooves provided in the outer wall of the central rotor (21), and the five pressure-equalizing grooves and the four gas inlet grooves (211, 212, 213, 214) are alternately distributed.

5. The pneumatic liquid on-line automatic balancer of the rotor of claim 1, wherein, the sealed balancing disk (1') comprises a body (11') of the balancing disk and a cover (12') which is hermetically fixed with the body (11') of the balancing disk, the chambers are formed into two pairs, comprising a first, a second, a third and a fourth chambers (31', 32', 33', 34'), the first and the third chambers are formed into one pair and the second and the fourth chambers are formed into the other pair, the pressure transfer device (9') comprises a gas distributor (2') and two position three way electromagnetic valves which are communicated in turn, the gas distributor (2') comprises a central stator (21') and a middle sleeve (22'), the central stator (21') is arranged in the central hole (111') in the body (11') of the balancing disk and the middle sleeve (22') is arranged between the central stator (21') and the body (11') of the balancing disk, there is a tight fit between the middle sleeve (22') and a wall of the central hole (111') and there is a gap between the middle sleeve and the central stator (21'), two bearings are respectively arranged at both ends of the middle sleeve (22'), there is a tight fit between an outer race of the bearing and the wall of the central hole (111') as well as between an inner race of the bearing and the central stator (21'), a first, a second, a third and a fourth axial inlet channels (211', 212', 213', 214') are provided in the central stator (21') and four circumferentially distributed annular grooves (215', 216', 217', 218') are provided in an outer wall of the central stator (21'), a first end of each of the four axial inlet channels is respectively communicated with the annular groove through a radial vent, a gas injection tube (331') is provided in inner walls of the four chambers, respectively, in an outer surface of the middle sleeve (22') is provided with four axial grooves (221'), one end of which is communicated with the gas injection tubes of the four chambers respectively and the other end of which is communicated with the annular groove in the central stator (21') through the vent, the vents are provided at the ends of the axial grooves respectively and passed through the middle sleeve (22'), gas is inputted to second ends of the first, the second, the third and the fourth axial inlet channels (211', 212', 213', 214') through a supply pipe, respectively, one of the two position three way electromagnetic valves is provided in each the supply pipe, a central hole is provided in the cover (12') and the cover (12') comprises a left, a right plate (121', 123') and a middle plate (122') fixed together in turn, a second balancing liquid communication channel (42') and a second balancing channel (52') of the second and the fourth chambers are provided in a right side of the left plate (121') and a first balancing liquid communication channel (41') and a first balancing channel (51') of the first and the third chambers are provided in a left side of the right plate (123'), centers of the first and the second balancing liquid communication channels (41', 42') are respectively connected with first ends of the first and the second balancing channels (51', 52'), the cover (12') is also provided with a first and a second emptying channels (61', 62'), the second emptying channel (62') is opened to the atmosphere through the right plate and the middle plate and the first emptying channel (61') is opened to the atmosphere through the right plate, second ends of the first and the second balancing channels (51', 52') are connected to the first and the second emptying channels (61', 62').

6. The pneumatic liquid on-line automatic balancer of the rotor of claim 5, wherein, there are also five pressure-equalizing grooves in the central stator (21') which are circumferential annular grooves provided in the outer wall of the central stator (21'), the five pressure-equalizing grooves and annular grooves (215', 216', 217', 218') are alternately distributed, and the pressure-equalizing grooves are communicated with five pressure relief holes provided in the middle sleeve (22').

7. The pneumatic liquid on-line automatic balancer of the rotor of claim 1, wherein, the sealed balancing disk (1") comprises a body (11") of the balancing disk and an alternative cover (12") fixed by each other, the pressure transfer device (9") comprises a gas distributor (2") and two position three way electromagnetic valves which are communicated in turn, the gas distributor (2") is located at an axial outside of the sealed balancing disk (1") and comprises a central rotor (21"), a middle sleeve (22") and an outer stator (23"), the outer stator (23") is sleeved on the central rotor (21") and the middle sleeve (22") is located between the central rotor (21") and the outer stator (23"), four axial inlet channels are provided in the central rotor (21") and a first, a second, a third and a fourth chambers (32", 32", 33", 34") are provided in the body (11") of the balancing disk, in which the first and the third chambers are formed into one pair and the second and the fourth chambers are formed into the other pair, the alternative cover (12") is made into three layers and comprises a left plate (121"), a right plate (123") and a middle plate (122") hermetically sealed by each other, the right plate (123") is integrated with the central rotor (21"), the balancing liquid communication channel between the second and the fourth chambers is the second communication channel (42") in a right side of the left plate (121") and the balancing liquid communication channel between the first and the third chambers is the first communication channel (41") in a left side of the right plate (123"), the balancing channels are the second balancing channel (52") in the right side of the left plate (121") and the first balancing channel (51") in the left side of the right plate (123"), in the left side of the right plate (123") are provided with four gas injection channels (1231", 1232", 1233", 1234"), one end of which is respectively communicated with one axial inlet channel in the central rotor (21") and the other end of which is communicated with the four chambers respectively, centers of the first and the second communication channels (41", 42") are respectively connected with first ends of the first and the second balancing channels (51", 52"), second ends of the first and the second balancing channels (51", 52") are connected to a first and a second vents (61", 62") respectively, a first and a second axial extending emptying tubes are provided in the central rotor (21"), the first vent (61") is communicated with the first emptying tube through the right plate and the second vent (62") is communicated with the second emptying tube through the right and the middle plate, the first vent (61") and the first emptying tube form the first emptying channel and the second vent (62") and the second emptying tube form the second emptying channel, and the first and the second communication channels (41", 42") are Venturi necking channels.

8. The pneumatic liquid on-line automatic balancer of the rotor of claim 7, wherein, the ends of the first and the second emptying tube are both provided with an air-permeable and anti-liquid plug.

9. The pneumatic liquid on-line automatic balancer of the rotor of claim 8, wherein, the first, the second, the third and the fourth chambers (31", 32", 33", 34") are sectors.

10. The pneumatic liquid on-line automatic balancer of the rotor of claim 9, wherein, the arc outer wall of each the chamber is a conical surface outward leaned in an axial direction.

11. The pneumatic liquid on-line automatic balancer of the rotor of claim 10, wherein, connections between the first communication channel (41") and the first and the third chambers (31", 33") are respectively notched in grooves (311", 331") in the arc outer walls of the first and the third chambers, and the connections between the second communication channel (42") and the second and the fourth chambers (32", 34") are respectively notched in the grooves in the arc outer walls of the second and the fourth chambers.

12. The pneumatic liquid on-line automatic balancer of the rotor of claim 11, wherein, the alternative cover (12") is made into four layers instead of the three-layer cover and comprises a left plate (121"), a middle plate (122"), a first right plate (123") and a second right plate (124"), four gas injection channels are positioned in a right side of the left plate (121"), the first communication channel (41") is positioned in a left side of the first right plate (123"), the second communication channel (42") is positioned in a left side of the second right plate (124"), and the first and the second communication channels (41", 42") are Venturi necking channels.

13. The pneumatic liquid on-line automatic balancer of the rotor of claim 12, wherein, there are also five pressure-equalizing grooves (217) in the central rotor (21), which are circumferential annular grooves provided in the outer wall of the central rotor (21), and the five pressure-equalizing grooves and the four gas inlet grooves (211, 212, 213, 214) are alternately distributed.

* * * * *